United States Patent [19]

Mathews

[11] Patent Number: 5,956,752
[45] Date of Patent: Sep. 21, 1999

[54] METHOD AND APPARATUS FOR ACCESSING A CACHE USING INDEX PREDICTION

[75] Inventor: Gregory S. Mathews, Santa Clara, Calif.

[73] Assignee: Intel Corporation, Santa Clara, Calif.

[21] Appl. No.: 08/767,082

[22] Filed: Dec. 16, 1996

[51] Int. Cl.[6] .............................. G06F 12/10; G06F 9/38
[52] U.S. Cl. .................. 711/204; 711/205; 711/207; 711/3
[58] Field of Search .................... 711/207, 205, 711/206, 3, 204, 203, 202

[56] References Cited

U.S. PATENT DOCUMENTS

| | | | |
|---|---|---|---|
| 5,148,538 | 9/1992 | Celtruda et al. | 711/205 |
| 5,386,527 | 1/1995 | Bosshart | 711/3 |
| 5,392,410 | 2/1995 | Liu | 711/3 |
| 5,418,922 | 5/1995 | Liu | 711/3 |
| 5,761,712 | 6/1998 | Tran et al. | 711/126 |

*Primary Examiner*—Eddie P. Chan
*Assistant Examiner*—Yamir Encarnacion
*Attorney, Agent, or Firm*—Charles K. Young

[57] ABSTRACT

Index prediction is used to access data in a memory array. A virtual address is received at an input. The virtual address is translated to a physical address. The memory array is accessed at a predicted address. A portion of the predicted address is compared to a portion of the physical address. If the portion of the predicted address is different from the portion of the physical address, then the predicted address was an incorrect prediction. The memory array is accessed at the physical address.

11 Claims, 8 Drawing Sheets

|  | VA = PA | VA ≠ PA |
|---|---|---|
| CA = PA | DON'T PREDICT NEXT / CURRENT PREDICTION OK | PREDICT NEXT / CURRENT PREDICTION OK |
| CA ≠ PA | DON'T PREDICT NEXT / CURRENT PREDICTION WRONG | PREDICT NEXT / CURRENT PREDICTION WRONG |

FIG. 8

METHOD AND APPARATUS FOR ACCESSING A CACHE USING INDEX PREDICTION

FIELD OF THE INVENTION

The present invention relates to the field of integrated circuits. More particularly, this invention relates to index prediction of a cache.

BACKGROUND OF THE INVENTION

A cache is a very fast local storage memory that is used by a processor that typically resides between the processor and main system memory. The cache decreases the latency to the slower main system memory by holding copies of code and data that are frequently requested from the main system memory by the processor. A cache may reside within the processor itself, outside the processor, or both inside and outside the processor.

A processor may use memory management mechanisms such as segmentation and paging, as are well-known in the prior art. Paging, for example, allows data to be referenced within a large continuous address space, or virtual address space. The virtual address space may be much larger than the actual memory space of the system in which the processor resides. Paging hardware translates the virtual address to a physical address. A physical address is said to be aliased when it corresponds to more than one virtual address.

A cache can be fully associative, set associative, or direct mapped. In a fully associative cache, each item of information from main system memory is stored as a unique cache entry. There is no relationship between the location of the information in the cache memory array and its original location in system memory. If there are N storage locations in the cache, the cache can store the last N main system memory locations accessed by the processor.

In a set associative cache, the cache is divided into banks of memory, or "ways". A 2-way set associative cache divides the cache into 2 ways, a 4-way set associative cache into 4 ways, and so on. For example, a 64 Kilobyte (64K) 2-way set associative cache is organized as two 32K ways (64K/2-way=32K). Each location from the system memory can map only to one location in a cache way.

A direct mapped cache uses the entire data cache as one bank of memory or way. The cache sees main system memory as logically broken up into pages, each page the size of the cache. For example, a 64K direct mapped cache would logically see main system memory as a collection of 64K pages. Each location in any main system memory page directly maps to only one location in the cache.

A "physically-indexed" cache is addressed only with address bits that do not require virtual-to-physical address translation. Such an organization is highly desirable since it avoids address aliasing problems and can be optimized to allow the cache access and the virtual to physical address translation to proceed in parallel. The virtual-to-physical address translation is performed by a Translation Look-aside Buffer (TLB).

Physically-indexed cache organizations are constrained by the minimum system page size, cache capacity and associativity. For example, if the minimum system page size is 4K, physically-indexed cache organizations are limited to: 4K with a set associativity of 1 (direct mapped), 8K with a set associativity of 2, 16K with a set associativity of 4 and so on. That is, each cache "way" can only be as large as the minimum page size and increases in the cache capacity must increase the associativity to maintain the physical indexing property. For a large cache to be physically indexed and support small page sizes, it must have a large number of ways. However, high associativity caches result in timing penalties, large power dissipations and high area costs. For these reasons, typical cache organizations limit the associativities to 2, 4, and sometimes 8.

A cache is "virtually-indexed" if at least one of the address bits used to access the cache may be different from corresponding physical address bits. Consider a 64K cache with a 4-way set associativity and a page size of 4K. To access the cache, the virtual address bits VA[13:0] are used. Because the page size is 4K, only the physical translation for VA[11:0] are known at cache access time. Since, through translation, multiple virtual addresses can be mapped to the same physical address, i.e., two or more virtual addresses are aliased to the same physical location, it is possible for reads and writes to access the same physical data through different virtual addresses (possibly at the same time). In this case, to guarantee that all references to the same physical address get the right data, a "virtually-indexed" cache maintains a separate mechanism to locate all virtual aliases. This mechanism is often costly in terms of complexity, area and power and is usually a deterrent to implementing "virtually-indexed" caches.

The aliasing problem described above can be simply solved by first translating VA[13:12] before the cache is accessed, thus allowing the cache to be physically-indexed. However, this requires the cache access to be delayed until the address translation is available. This increase in cache access latency is a highly undesirable condition.

SUMMARY OF THE INVENTION

Index prediction is used to access data in a memory array. A virtual address is received at an input. The virtual address is translated to a physical address. The memory array is accessed at a predicted address. A portion of the predicted address is compared to a portion of the physical address. If the portion of the predicted address is different from the portion of the physical address, then the predicted address was an incorrect prediction. The memory array is accessed at the physical address.

These and other advantages of the present invention are fully described in the following detailed description.

BRIEF DESCRIPTION OF THE DRAWINGS

FIG. 8 is a table showing the prediction behavior of the present invention based upon combinations of the predicted cache address (CA), the physical address (PA), and the virtual address (VA).

DETAILED DESCRIPTION

An apparatus and method for providing an improved cache using index prediction are described. The invention uses index prediction to access a cache to avoid address translation latency: When the cache receives a virtual address from which to read data, the cache is accessed at a predicted address, and concurrently, the virtual address is translated to a physical address. The physical address is then compared to the predicted address. If the physical address matches the predicted address, then the data retrieved from the predicted address is correct. However, if the physical address does not match the predicted address, then the cache is re-accessed at the physical address. Thus, when prediction is correct, address translation latency is avoided.

Similarly, for a store to the cache, a predicted address is used to determine whether the data resides in the cache, and concurrently, the virtual address is translated to a physical address. The physical address is then compared to the predicted address. If the physical address matches the predicted address, then the information regarding whether the requested data resides in the cache is correct. However, if the physical address does not match the predicted address, then the cache is re-accessed at the physical address.

When virtual address bits used to access the cache do not match physical address bits used to access the cache, then a buffer is used to store the physical address bits. In a subsequent cache access, the physical address bits stored in the buffer may be used in a predicted address.

Figure 1:
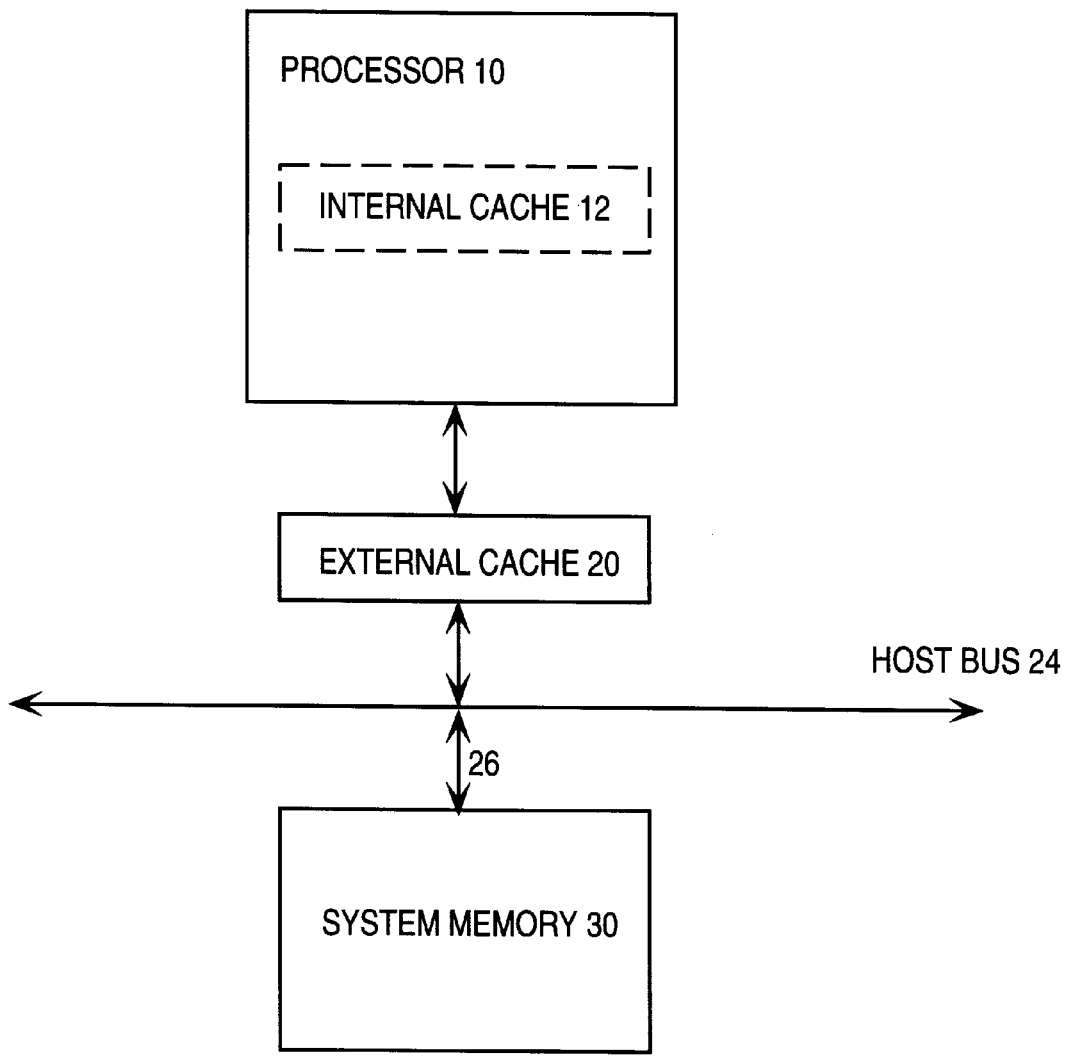
FIG. 1 is a block diagram of a prior art processor and system memory coupled to a host bus.

FIG. 1 is a block diagram of a prior art processor 10 and system memory 30 coupled to a host bus 24. The processor 10 includes an internal cache 12. The processor 10 is optionally coupled to an external cache 20 which may be situated either between the processor 10 and the host bus 24 (as shown) or alongside a bus coupling the processor 10 to the host bus 24 so that the external cache 20 can monitor the cycles being performed by the processor 10 (not shown).

The system memory 30 is coupled to the host bus 24 via a bus 26. The internal cache 12 provides data to the processor 10 when it has a copy of the data requested by the processor 10. If the internal cache 12 does not have a copy of the data, then the external cache 20 is checked to see if it has a copy. If neither the internal cache 12 nor the external cache 20 have the requested data, then the data is retrieved from the system memory 30.

The internal cache typically includes a memory array, tag array, and control logic (not shown). The memory array stores the data. The tag array holds a copy of the addresses stored in the memory array, so that a check can be performed to determine whether the cache has a requested data item. The control logic manages the retrieval of data from the external cache and system memory. The control logic also determines, using such means as a least recently used method, which entry in a cache will be replaced by a new entry, should a new data item need to be placed in the cache.

Figure 2:
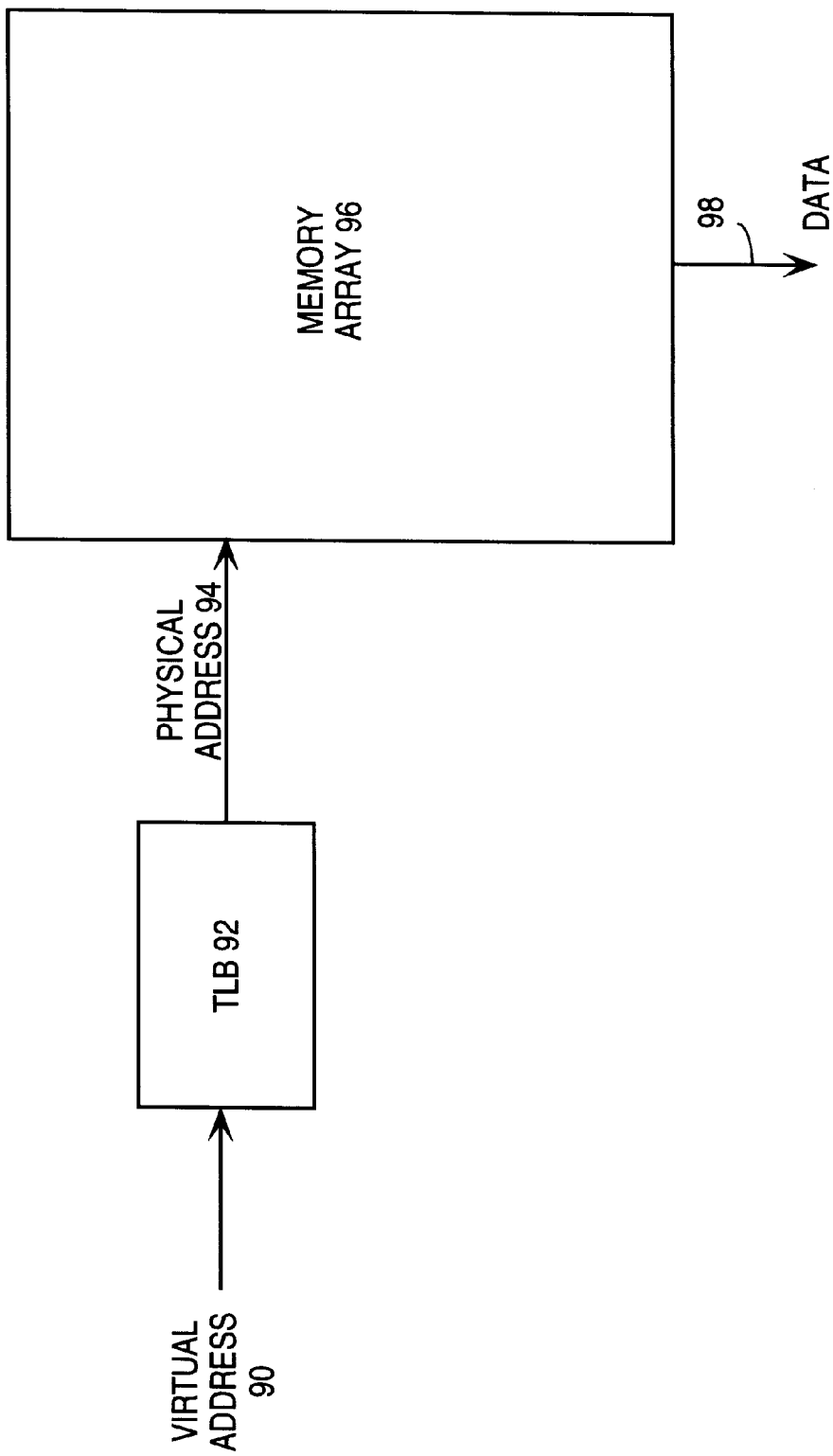
FIG. 2 is a block diagram showing a prior art mechanism for decoding a linear, or virtual, address within a processor.

FIG. 2 is a block diagram showing a prior art mechanism for decoding a linear, or virtual, address 90 within a processor. The virtual address 90 is provided to a translation lookaside buffer (TLB) 92, which provides a physical address 94 to the memory array 96 of the cache. Tag array and control logic (not shown) may be employed by the cache, as is well-known in the prior art. The memory array 96 provides the requested data 98, if it has a copy of the data, at a cache output 98.

In one embodiment of the invention, the processor supports multiple page sizes. For example, it may support 4 K, 16 K, 64 K, and 4 Megabyte page sizes.

Figure 3:
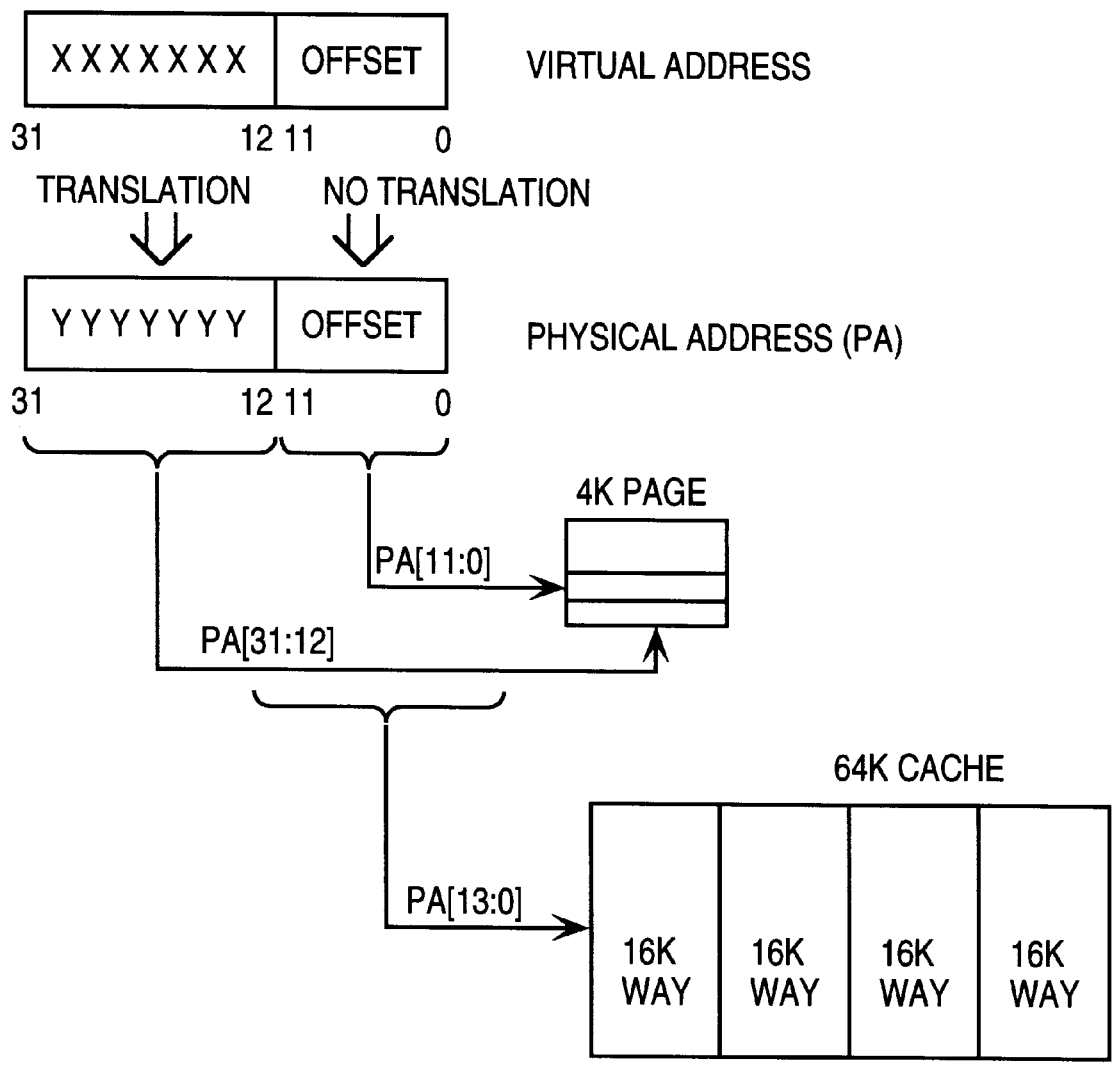
FIG. 3 shows a representative virtual address corresponding to a 4K page of data and a 64K 4-way set associative cache.

FIG. 3 shows a representative virtual address corresponding to a 4K page of data and a 64K 4-way set associative cache. The offset of the virtual address comprises 12 bits, from bit 11 to bit 0. The translation of the virtual address to a physical address leaves the 12-bit offset invariant. The upper part of the physical address points to a 4K page frame, and the offset of the physical address (PA[11:0]) points to a particular operand within the page frame. The lower 14 bits of the physical address (PA[13:0]) are provided to the 64K cache. Each of the 4 ways of the cache are checked to see if they have a copy of the requested data operand.

Because the page size (4K) is smaller than the size of one way of the cache (16K), there is a chance that VA[13:12] will not match PA[13:12]. Thus, it may be beneficial to predict bits PA[13:12] instead of waiting for the virtual address bits to be translated. The virtual address offset, VA[11:0], however, will match PA[11:0], because the 12-bit offset is invariant between the virtual address and the physical address.

Figure 4:
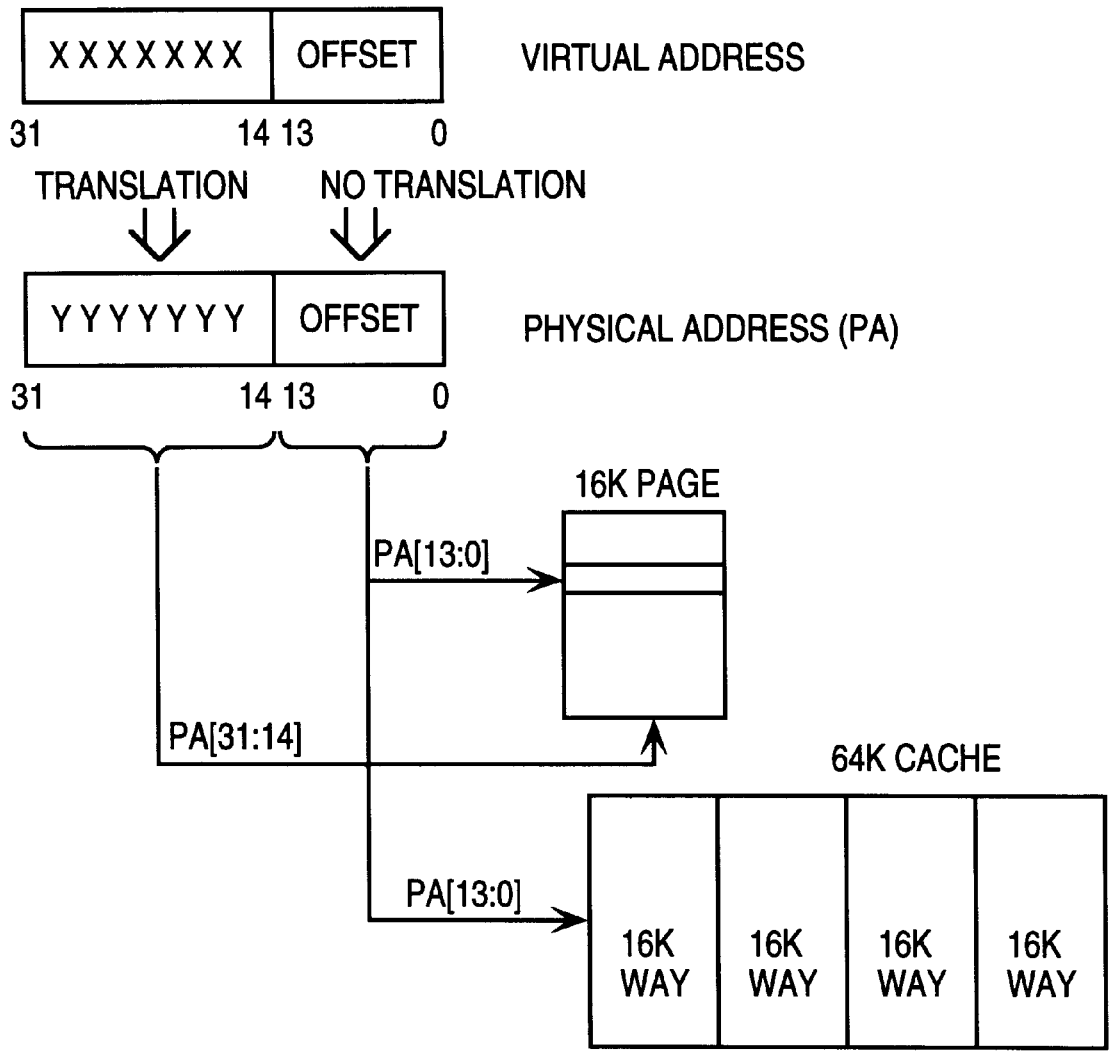
FIG. 4 shows a representative virtual address corresponding to a 16K page of data and a 64K 4-way set associative cache.

FIG. 4 shows a representative virtual address corresponding to a 16K page of data and a 64K 4-way set associative cache. The offset of the virtual address comprises 14 bits, from bit 13 to bit 0. The translation of the virtual address to a physical address leaves the 14-bit offset invariant. The upper part of the physical address points to a 16K page frame, and the offset of the physical address (PA[13:0]) points to a particular operand within the page frame. The lower 14 bits of the physical address (PA[13:0]) are provided to the 64K cache. Each of the 4 ways of the cache are checked to see if they have a copy of the requested data operand.

Because the page size corresponds to the size of a way of the cache, there will not be a need for cache index prediction. The offset bits of the virtual address will be the same for the physical address.

Figure 5:
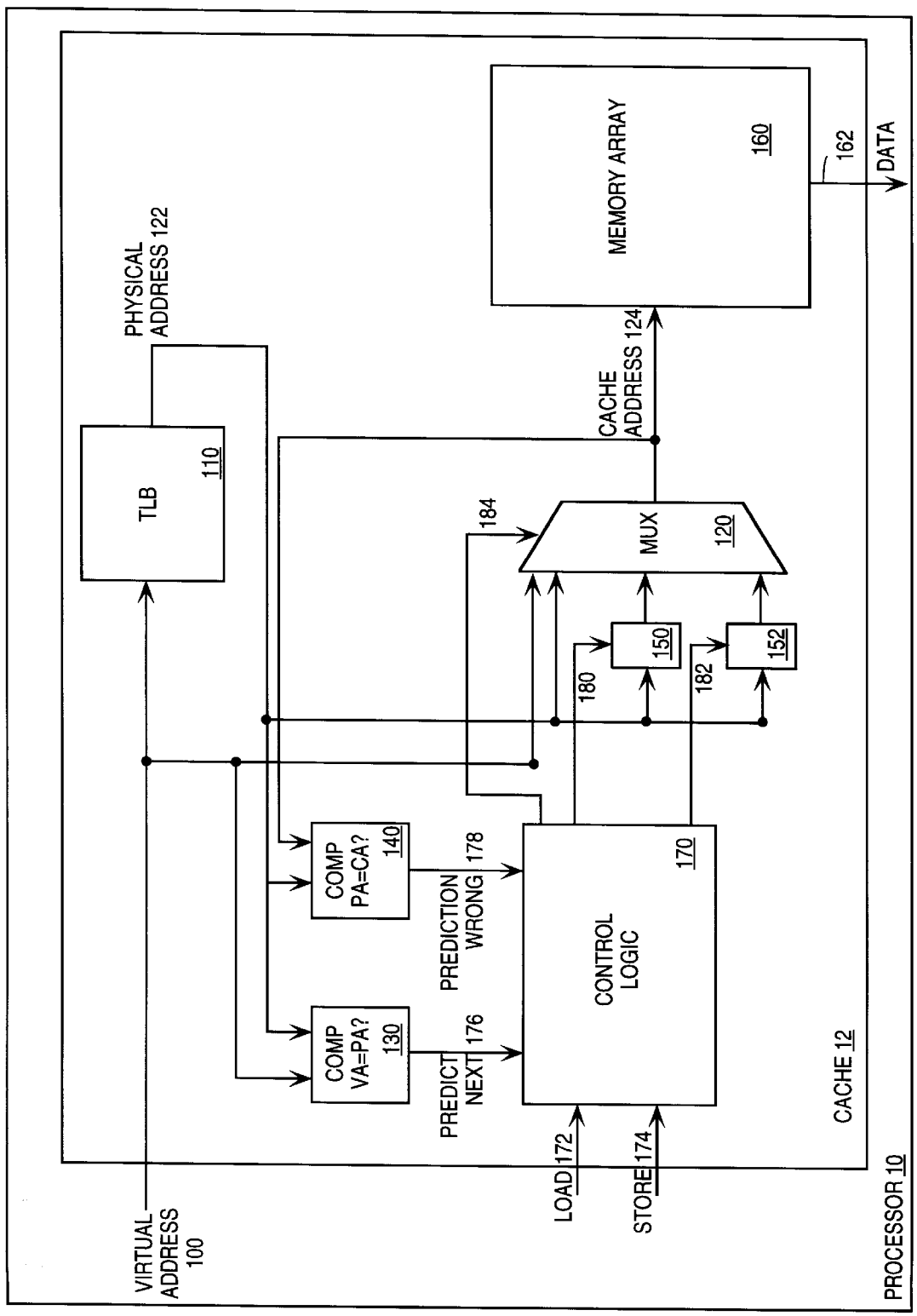
FIG. 5 is a block diagram showing one embodiment of the present invention.

FIG. 5 is a block diagram showing one embodiment of the present invention. In this embodiment, the invention resides within cache 12 within processor 10. However, in another embodiment the invention could be used in a cache system that does not reside within a processor.

A virtual address 100 is provided to a TLB 110, a multiplexer (MUX) 120, and a prediction comparator 130. The TLB 110 performs an address translation on the virtual address 100 to produce a physical address 122. The physical address 122 is provided to the prediction comparator 130, a verification comparator 140, the MUX 120, load latch 150, and store latch 152.

The MUX 120 receives input from the virtual address 100, the physical address 122, load latch 150, and store latch 152. The MUX 120 provides a cache address output 124 which is provided to the verification comparator 140 and to the memory array 160. The memory array 160 provides cache data at an output 162.

For one embodiment, the control logic 170 receives load signal 172 and store signal 174, which come from a decoder of the processor. The load signal 172 indicates that the current operation is a read from memory. The store signal 174 indicates that the current operation is a store to memory. The control logic 170 also receives a predict next output 176 from the comparator 130 and a prediction wrong output 178 from the verification comparator 140. The control logic 170 provides signal 180 to cause the load latch 150 to latch the physical address provided to it. The load latch 150 provides the latched physical address to the MUX 120. Similarly, the control logic 170 provides signal 182 to cause the store latch 152 to latch the physical address provided to it. The store latch 152 provides the latched physical address to the MUX 120. The control logic 170 also provides a selector signal 184 to the MUX 120 to pass one of the inputs of the MUX 120 as an output of the MUX 120.

The prediction comparator 130 receives an input from the virtual address (VA) 100 and the physical address (PA) 122. The prediction comparator 130 compares the two addresses and provides the predict next output 176. The predict next output 176 indicates whether to predict a subsequent cache access. If the predict next output 176 is active and the load signal 172 is active, then the signal 180 is provided to load latch 150 to latch the physical address provided to load latch 150. If the predict next output 176 is active and the store signal 174 is active, then the signal 182 is provided to store latch 152 to latch the physical address provided to store latch 152.

In one embodiment, the load latch 150 is replaced by multiple load latches, each of which stores data from a particular type of load, e.g., floating point loads, integer loads, loads of a particular size, or stack loads (pops). The store latch 152 may also be replaced by multiple store latches, each of which stores data from a particular type of store, e.g., floating point stores, integer stores, stores of a particular size, or stack stores (pushes).

The comparator 140 receives an input from the physical address (PA)122 and the cache address (CA) 124. The comparator 140 provides a prediction wrong output 178. If the physical address input does not match the cache address input then the prediction wrong output 178 is asserted to the control logic 170. The prediction wrong signal indicates that an incorrect index prediction occurred. When an incorrect prediction occurs, the cache is accessed again with the physical address that was decoded by the TLB 110.

Other address inputs can be provided to the MUX 120. For example, a snoop address may be provided to the MUX 120. The snoop address is passed through the MUX without prediction since snoop addresses are physical addresses. Additionally, one or more latches may be needed to synchronize the inputs and outputs of various components, such as the TLB 110 and the MUX 120.

For one embodiment, because the bits corresponding to the minimum page size are invariant to address translation, they can be provided directly to the memory array. Thus, only the upper part of the virtual address needed for performing the cache access (the "relevant upper portion" of the virtual address) is provided to the cache prediction circuitry. For example, in the case of a 4K page and a 64K 4-way cache as described with respect to FIG. 3, only VA[13: 12] is predicted via the cache prediction circuitry of FIG. 5. For another embodiment, the entire lower part of the virtual address needed for performing the cache access, e.g., VA[13:0] is provided to the cache prediction circuitry of FIG. 5.

For an embodiment that has variable page sizes, the relevant upper portion of the virtual address may be predicted via the circuitry of FIG. 5 for a first page size. If the processor subsequently switches to a larger page size, then prediction may no longer be necessary.

Figure 6:
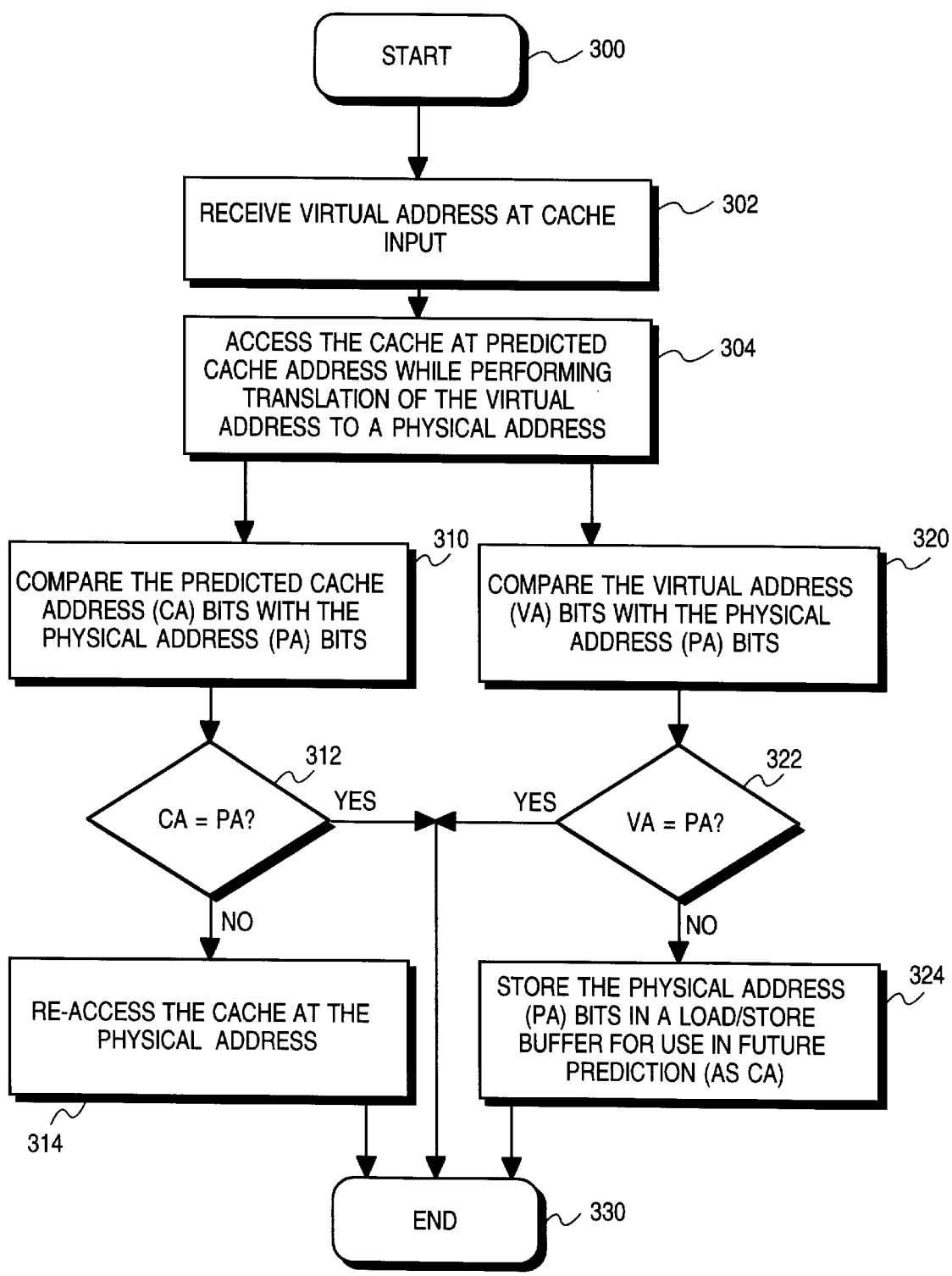
FIG. 6 is a flowchart showing the steps taken in index prediction.

FIG. 6 is a flowchart showing the steps taken in index prediction. The flowchart starts at a block 300, from which it continues at block 302. At block 302, a virtual address is received at a cache input. At block 304, the cache is accessed at a predicted cache address while the virtual address is being translated to a physical address by the TLB 110. In a first mode, the predicted cache address is the same as the virtual address, i.e., the virtual address 100 is passed through the MUX 120 as the cache address 124 to the memory array 160. In a second mode, the predicted cache address is provided by one of the latches 150 or 152, as will be described with respect to FIG. 7. From block 304, the flowchart splits into two paths, starting at blocks 310 and 320, which are processed independently.

At block 310, the relevant upper portion of the predicted cache address (CA) is compared with the relevant upper portion of the physical address by the prediction comparator 130. Operation continues at block 312. If the portion of the predicted cache address (CA) matches the portion of the physical address (PA), then operation proceeds at block 330, at which the flowchart terminates. However, if at block 312, the portion of the predicted cache address (CA) does not match the portion of the physical address (PA), then the previously predicted cache address was incorrectly predicted. The cache is re-accessed at the physical address that was translated by the TLB 110, as shown by block 314. From block 314, the flowchart terminates at block 330.

From block 320, the relevant upper portion of the virtual address is compared with the relevant upper portion of the physical address by the verification comparator 140. Operation continues at block 322. If the portion of the virtual address does not match the portion of the physical address, then operation proceeds at block 324 at which the portion of the physical address is stored in a buffer or latch, such as load latch 150 or store latch 152 shown in FIG. 5. This saved physical address is used for a subsequent cache access, as will be described with respect to FIG. 7. From block 324, operation proceeds at block 330, at which the flowchart terminates. However, if at block 322, the portion of the virtual address matches the portion of the physical address, then there is no need to predict a subsequent cache access because the virtual address can be provided directly for the next cache access. From block 322, the flowchart terminates at block 330.

Figure 7:
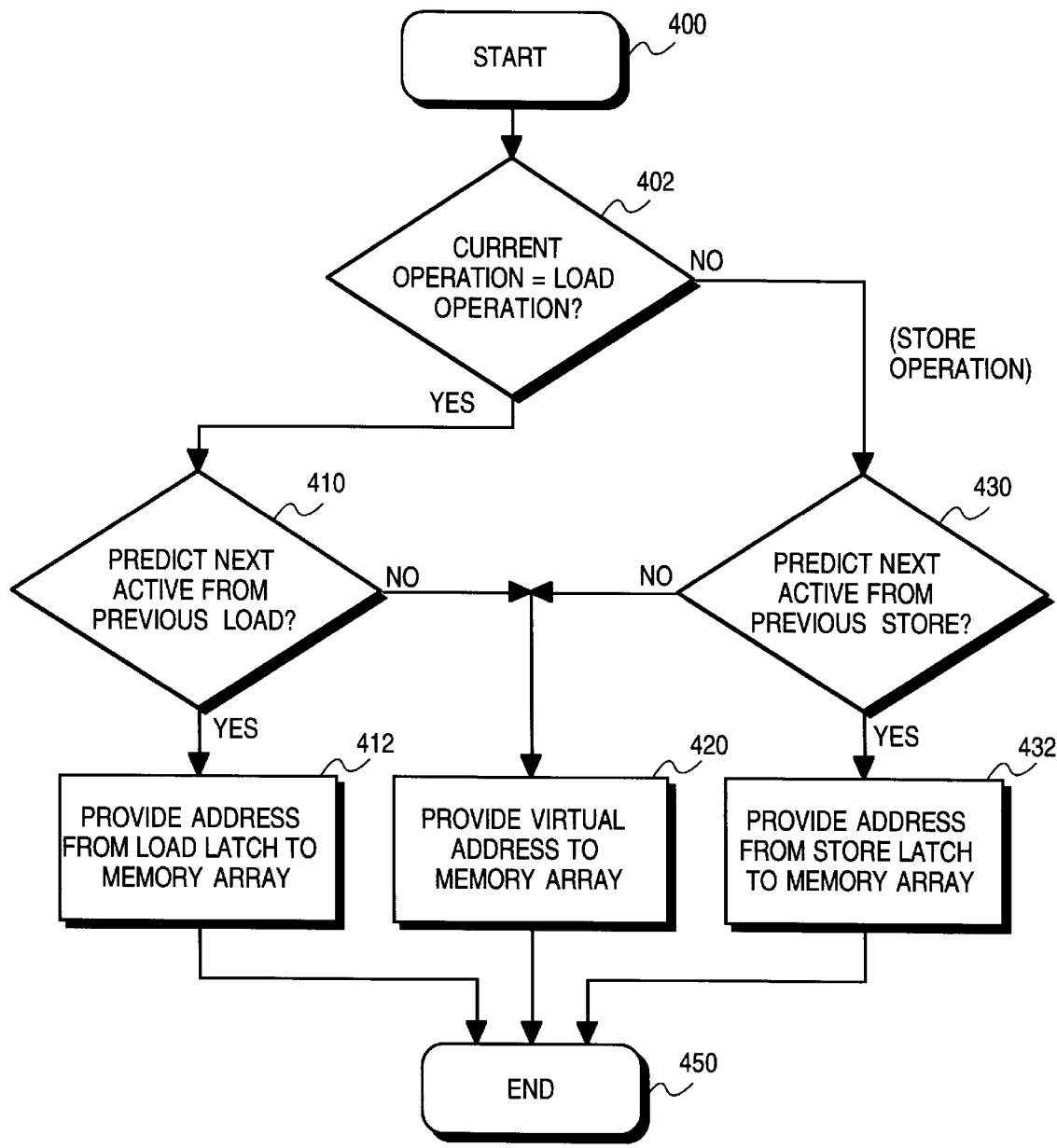
FIG. 7 is a flowchart showing the steps taken by the control logic 170 in index prediction.

FIG. 7 is a flowchart showing the steps taken by the control logic 170 in index prediction. The flowchart starts at a block 400, from which it continues at block 402. At block 402, a determination is made whether the current operation is a load operation or a store operation. The control logic 170 uses the load signal 172 and the store signal 174 to make its determination.

If the current operation is a load operation, then the flowchart continues at block 410. At block 410 a determination is made whether the predict next signal 176 was active from the previous load operation. For one embodiment, this information is latched within control logic 170. If the predict next signal 176 was active from the previous operation, then the flowchart continues at block 412, at which the load latch 150 provides its address, or index, to the memory array 160. From block 412, operation terminates at block 450.

If, at the block 410, however, the predict next signal 176 was not active from the previous load operation, then the flowchart proceeds to block 420, at which the virtual address is provided to the memory array 160 as the predicted cache address. From block 420, operation terminates at block 450.

However, if at block 402, the operation is a store operation, and not a load operation, then the flowchart continues at block 430, at which a determination is made whether the predict next signal 176 was active from the previous store operation. For one embodiment, this information is latched within the control logic 170. If the predict next signal 176 was active from the previous operation, then the flowchart continues at block 432, at which the store latch 152 provides its address to the memory array 160. From block 432, operation terminates at block 450.

If at the block 430, however, the predict next signal 176 was not active from the previous store operation, then the flowchart proceeds to block 420, at which the virtual address is provided to the memory array 160, as was previously described.

FIG. 8 is a table showing the prediction behavior of the present invention based upon combinations of the predicted cache address (CA), the physical address (PA), and the virtual address (VA). At times, the virtual address (VA) is provided to the cache as the predicted cache address (CA), i.e., the virtual address is simply passed to the cache. At other times, a latch provides an address to the cache as the predicted cache address (CA). In this case, a physical address that was previously saved in the latch is used to predict a subsequent cache access.

Referring to FIG. 8, when VA is the same as PA, a subsequent cache access is not predicted. This condition occurs when the access is to a page size equal to or greater than a way of the cache, or if the page size being accessed is smaller than a way of the cache but nevertheless the "relevant upper address bits" of VA and PA are the same. In either case, no prediction of the next access of the same type is necessary. In other words, the load latch 150 and the store latch 152 do not latch the physical addresses presented to them.

When the virtual address (VA) differs from the physical address (PA), the physical address (PA) is saved to predict the index of a subsequent cache access. This occurs when the page size is smaller than a way of the cache and the relevant upper address bits of the virtual address differ from those of the physical address. This condition results in a subsequent cache access being predicted by saving the relevant physical address bits in one of the latches 150 or 152. For one embodiment, there is only one buffer or latch which stores the physical address whether the operation is a load operation or a store operation. For another embodiment, there are two buffers (or latches). One buffer keeps track of addresses used for load operations. The other buffer keeps track of addresses used for store operations. Typically, load operations may access one page in memory, while store operations access another page in memory. This happens, for example, when transferring data from one page to another.

When the predicted cache address (CA) is the same as the physical address (PA), this indicates that either the VA was used to provide the predicted cache address and the prediction was correct, or that one of the latches 150 or 152 was used to provide the predicted address and that the prediction was correct.

When CA is not the same as PA, this indicates that the virtual address was used as the prediction and that the prediction was incorrect, or that one of the latches 150 or 152 was used to provide the predicted cache address and that the prediction was incorrect. In either case, the cache is re-accessed using the physical address which was just translated by the TLB 110.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of accessing data in a memory array, the method comprising the steps of:
   (a) receiving a virtual address at an input;
   (b) translating the virtual address to a physical address;
   (c) accessing the memory array at a predicted address;
   (d) using a first comparator to compare a portion of the predicted address to a portion of the physical address;
   (e) accessing the memory array at the physical address if the portion of the predicted address is different from the portion of the physical address;
   (f) using a second comparator to compare a portion of the virtual address to the portion of the physical address, and
   (g) storing the portion of the physical address in a buffer if the portion of the virtual address is different from the portion of the physical address.

2. The method of claim 1 further comprising the step of:
   (h) using prediction for a subsequent access if the portion of the predicted address matches the portion of the physical address in the step (d), and not using prediction on a subsequent access if the portion of the predicted address does not match the portion of the physical address in the step (d).

3. The method of claim 1 wherein, in a first mode, the virtual address is provided as the predicted address in the step (c), and in a second mode, the buffer of the step (g) provides the predicted address in the step (c).

4. The method of claim 3 further comprising the step of:
   (h) using the portion of the physical address stored in the buffer for a subsequent access to the memory array.

5. A cache memory comprising:
   an address translator having an input to receive virtual address bits of a current operation, the address translator providing physical address bits at an output;
   first comparator circuitry having an input from both the physical address bits and the virtual address bits, the first comparator circuitry providing a prediction output indicating whether the physical address bits match the virtual address bits;
   a first latch coupled to receive the physical address bits from the address translator, the first latch coupled to latch the physical address bits responsive to a predetermined state of the prediction output of the first comparator circuitry, the first latch providing a first latch output;
   a multiplexer coupled to receive the virtual address bits and the physical address bits, the multiplexer providing cache address bits at a multiplexer output; and
   second comparator circuitry having an input from both the physical address bits and the cache address bits, the second comparator circuitry providing a verification output indicating whether the physical address bits match the cache address bits.

6. The cache memory of claim 5 further comprising:
   a second latch coupled to receive the physical address bits from the address translator, the second latch coupled to latch the physical address bits responsive to the predetermined state of the prediction output of the first comparator circuitry, the second latch providing a second latch output, wherein the first latch latches the physical address bits if the current operation is a load operation, and the second latch latches the physical address bits if the current operation is a store operation.

7. The cache memory of claim 5 wherein the first latch output is coupled to provide an address input to a memory array.

8. A circuit comprising:

a memory array;

comparator means, the comparator means having an input from a virtual address, a physical address, and a predicted address, the comparator means providing a first comparator signal indicating whether prediction is to be used on a subsequent data access, and the comparator means providing a second comparator signal indicating whether a current data access is correctly predicted;

control logic receiving the first and second comparator signals, the control logic for providing an access address to the memory array responsive to the first and second comparator signals.

9. The circuit of claim 8 wherein the address storage means comprises:

a first latch means that latches the predicted cache address when the subsequent access is a load access; and a second latch means that latches the predicted cache address when the subsequent access is a store access.

10. The circuit of claim 8 wherein the address storage means comprises:

a first latch that latches the predicted cache address when the subsequent access is a load access; and a second latch that latches the predicted cache address when the subsequent access is a store access.

11. The circuit of claim 10 further comprising an instruction decoder, the instruction decoder providing an indication whether the subsequent access is a load access.

\* \* \* \* \*